United States Patent [19]
Polcyn et al.

[11] Patent Number: 5,878,418
[45] Date of Patent: Mar. 2, 1999

[54] AUTO DEFINITION OF DATA SETS AND PROVISIONING INTERFACES FOR CALL AUTOMATION

[75] Inventors: Michael J. Polcyn, Allen; Eric Weeren, Carrollton; Myra Hambleton, Plano, all of Tex.

[73] Assignee: InterVoice Limited Partnership, Reno, Nev.

[21] Appl. No.: 909,636

[22] Filed: Aug. 12, 1997

[51] Int. Cl.$^6$ ...................................................... G06F 17/30
[52] U.S. Cl. .......................... 707/10; 707/2; 707/5; 707/7; 707/101; 707/102; 707/103; 707/104; 707/200
[58] Field of Search .................. 707/2, 5, 7, 10, 707/101, 102, 103, 104, 200; 395/183.14, 200.33, 200.47, 200.57; 705/26; 84/622; 702/122, 179

[56] References Cited

U.S. PATENT DOCUMENTS

| 5,737,592 | 4/1998 | Nguyen | 707/4 |
| 5,764,916 | 6/1998 | Busey | 395/200.57 |
| 5,768,510 | 6/1998 | Gish | 395/200.33 |

*Primary Examiner*—Thomas G. Black
*Assistant Examiner*—Diane D. Mizrahi
*Attorney, Agent, or Firm*—Fulbright & Jaworski L.L.P.

[57] ABSTRACT

A system and method for generating a data set including information with respect to a plurality of data elements utilized by an application program is disclosed. The data set is used to automatically initialize a database of said data elements for use with said application program. The data set is also utilized to automatically generate a set of database maintenance applications providing user interfacing to the database.

63 Claims, 2 Drawing Sheets

230

ELEMENT NAME

TYPE (TEXT, NUMERIC, VOICE, FAX, ETC...)

LENGTH/SIZE

SECURITY LEVEL (RESTRICT ACCESS BY USER, LOCATION, DEVICE, ETC...)

GROUP ID

AUTO DEFINITION OF DATA SETS AND PROVISIONING INTERFACES FOR CALL AUTOMATION

RELATED APPLICATIONS

Reference is hereby made to the following co-pending and commonly assigned U.S. patent application: ENHANCED GRAPHICAL DEVELOPMENT ENVIRONMENT FOR CONTROLLING PROGRAM FLOW, Ser. No. 08/599,134, now pending the disclosure of which application is incorporated herein by reference.

TECHNICAL FIELD OF THE INVENTION

This invention relates to the generation of initial data sets of application data elements and their maintenance interfaces as typically required in developing voice interactive applications and, more specifically, to the automatic generation of these data sets and maintenance interfaces from information provided by a developer within an application creation tool.

BACKGROUND OF THE INVENTION

It is common today for a business or similar entity to utilize a voice response unit (VRU) in conjunction with a communication system and host information processor system in order to automate responses to client requests for services or information. Typically, a VRU is implemented at a business location as a subsystem interacting with the business'telephone communication system, such as a private branch exchange (PBX), and data processing systems.

The VRU subsystem itself is a processor-based system requiring an operating algorithm, or application, in order to interact with the PBX and data processing host, such as a LAN, according to the entity's desires in response to the user's inputs or data queries. This algorithm is a set of instructions presenting a user interface, or user dialogue, in the form of a call flow.

Typically, the user dialogue is but one component of a VRU application. Presently, to generate this one component, it is not uncommon for a developer to utilize some form of high level scripting tool to define a dialogue presenting the caller's choices, soliciting responses, and data input from callers. The dialogue may also provide for accessing other attached systems to retrieve information or perform some other functions, such as a call completion on behalf of the caller. Additionally, the dialogue may provide for the user to modify or customize the environment by allowing the input of certain parameters, such as a number of voice mailboxes desired, a length of message to record, etcetera.

However, operation of the VRU subsystem to present a desired call dialogue requires manipulation and interaction of a complex set of data elements including: system configuration options, such as system wide and user specific configuration options; system user or subscriber preferences and information; system access information, such as security or feature accessibility; etcetera. These data elements must both be initialized as well as be accessed from time to time, such as from a support system, in order to be maintained In present systems, data element initialization and maintenance functions are handled as a separate, and very discrete, programming function. For instance, a VRU application that maintains a data base for a set of subscribers, including user preferences, home phone numbers, cellular phone numbers, office phone numbers, etc., typically also includes a set of parameters that describe from a system level (application level) how the application should behave or operate, setting for instance the number of maximum mail boxes per user and algorithms for determining what messages should be forwarded to which mail boxes, etc.

All of the data elements used by the call dialogue must be initialized (create a data fill) upon deployment of the VRU application. Thereafter, the database storing the data elements may be runtime accessed by the VRU application to control the behavior of the application or to provide the data elements required for operation of the application.

Currently, providing user interfaces for database maintenance functions requires a second step of using a database programming language in order to build a separate set of interfaces for the database. Through these interfaces, typically in the form of user interactive input screens, an administrator or user may access the data elements to vary them or initialize them for a particular subscriber.

A problem encountered in present implementations is that changing the VRU application and/or adding new data elements requires a separate discrete programming effort to update the user interfaces to reflect changes in the data elements. Therefore, there is a real problem in synchronization of these user interfaces as changes and modifications are made to the application and/or its data elements. Maintaining this synchronization presently requires a considerable amount of time and effort in order to keep current these data maintenance screens.

Another problem with present implementations is the provision and modification of data element parameters such as data security level, data fill information, or what user has what type of access to a particular data element. For example, there may be a data element, such as the number of mail boxes or the length of a mail box in a voice mail application, which is initially modifiable by a system administrator. If the restriction were to be modified to enable the data element to be user modifiable, on a user by user basis, to be able to change the data element dynamically and to allow for all possible security levels and access methods to that data, a large number of screens would need to be built or modified. As a result, even where the data sets have been varied only slightly with the characteristics of that data, a significant amount of synchronization, and thus parallel programming, is required of present implementations.

A need therefore exists in the art for a system and method for providing data set definitions from information provided to an application creation tool.

A need also exists in the art for a system and method which generates user interfaces suitable for manipulating fill data associated with data sets utilized by an application creation tool.

A further need in the art exists for a system and method for modifying data set definitions when an associated application is modified.

A still further need in the art exists for a system and method for creating and/or modifying user interfaces suitable for manipulating fill data associated with the data sets of a service application as modified.

A need in the art also exists for a system and method providing initial fill data to initialize data sets associated with an application generated by an application creation tool.

SUMMARY OF THE INVENTION

The above and other needs are met by a system and method which, as part of the application generation process, defines data elements or data objects supplied within an application creation tool. Information provided in the application creation tool, with respect to the data elements, as part of the application creation will typically include attributes of the data elements such as the data type, i.e., whether it is numeric or text data, field lengths, security levels, to restrict access, and the like. This information, possibly in conjunction with some other information provided regarding the grouping of the data elements, is used to automatically generate a set of user interface screens to maintain that data. These user interface screens may be generated using a very generic user interface, such as a Java or HTML browser interface.

For example, as an application is being developed, variables and other data elements are defined by the programmer. These data elements are managed by the data set definition function of the present invention such that data set definition information is ready for provision to data initialization and screen compiler algorithms at substantially the same time the application is ready for provision to a run time system.

Because the service creation tool itself is aware of all the data elements that are used therein, even within predefined functions and modular subroutines, the data set definition function is able to manage and organize the data elements automatically. Therefore, as new functions are used, the data set definition function is able to build an expanded data set and, thus, avoid the step of a developer having to go and discover where all those data elements are used. This is significant because, even where high level functions are utilized, the developer must often probe the lowest layer in order to understand the data types and the data elements used internally. At a minimum, the developer must reference the function header information, or something similar, in order to note the necessary data elements.

The data set definition, as managed by the data set definition function, may include such information as the name of the element, a type (text, numeric, voice, fax, and the like), the length or size of the element, the security level (restrictions on access by user, location, device type, etc.), and/or a group identifier (a description of what elements should be colocated on a given maintenance screen, for example) used for interface formatting.

The data initializer of the present invention may be utilized, for example, whenever a new application is loaded onto the run time system. When the application is deployed, the corresponding database has to be created, or initialized. Therefore, at system deployment, the data initializer is responsible for taking the data set definition and setting some initial state to the defined data elements. This will typically involve going into the database and creating data fields, creating the table definitions if it is a structured query language (SQL) database, the specific column names, and actually filling the database with some initial information. This initial information may be all zeros, or null information, but initialization creates the necessary data structure. At this point, the run time system could execute the application, however, there would not necessarily be any subscriber specific or application configuration data in place.

Subscriber specific or application configuration data could be provided by either of two methods. For example, the run time system itself, executing a call flow, may allow subscribers to initialize their databases, i.e., via dual tone multiple frequency (DTMF) telephone input, to add and/or select options, preferences, and the like. Here, users interact with the database under the call flow application control and initialize the data elements.

However, there may be a portion of the data that is restricted to a system administrator and, thus, is not modifiable by typical system users or subscribers. The system administrator, for instance, may be provided "super user" status within the call flow application or may be provided access to the database outside of the call flow application. For example, a PC equipped with an HTML browser, attached to a system hosting the database via a network, such as a local network, the Internet, or a wide area network, may provide the system administrator access to the data elements. In order to provide this system administrator with meaningful access to the data elements, a screen compiler of the present invention is utilized to generate application code defining user interface screens. In the case where the system administrator is using an HTML browser, this application code may be generated in such commonly used languages as Java or HTML.

The screen compiler would use data element information provided in developing the run time application, along with attributes such as type, length, size, security level, etc., to generate interface screens using a selected application code to accept/modify fill data within defined fields. For instance, a data maintenance screen to be presented on an HTML browser might have text fields, as defined in the data element definition information, only able to accept text. An attempt to enter numeric information within the field would not be permitted. Similarly, a field defined as numeric would only permit the entry of numeric values in those fields. The defined fields may also be limited in other ways, such as to a certain length or a certain range of values, as defined in the data element definition information.

Information provided by the data element definition may also describe the relationship of the data elements. A group identification field may be included in the definition of data elements when they are defined within the application development tool. This information may be used to correlate certain data elements, such as to indicate they should be presented graphically within the same screen. For example, within a voice mail application a set of data elements that describe the number of mail boxes, the length of the mail boxes, and how long a user may be able to maintain a message on the system are all variously related. A developer may, therefore, wish to group these as a single set of options for an application. By describing these elements as related in a group ID field, the screen compiler will utilize that information and generate a screen of all related data fields with a common group ID.

Moreover, data elements may belong to more than one group if desired. As such, a data element may appear upon different screens generated by the screen developer as indicated by the group ID information. Additionally, the group ID may indicate a relationship of data elements such that a data element appears for modification with one group of data elements, but is provided only as reference, i.e., is not modifiable, with another group of data elements.

It shall therefore be appreciated that a technical advantage of the present invention is that, as the service application is generated, so too are the user interface screens necessary for data fill and maintenance operations. As the data elements are described for the generation of the service application, or otherwise included within the service application, generation of maintenance screens is accomplished substantially automatically. Therefore, the second step in the prior art of separately generating user interface or maintenance screens, that have to be kept in sync with the data elements, is eliminated completely and replaced by a system of dynamically building these screens as the application is developed.

A further technical advantage, provided by the generation of the user interface screens from within the same tool as is used to develop the service application, is that modification of this application within this generation tool will also generate modified user interface screens. This eliminates problems of synchronizing modified data elements with their maintenance screens, as is common in present implementations.

Moreover, a technical advantage is realized in the present invention's ability to automatically initialize the database to be utilized by the generated service application. Such automatic initialization not only provides an expedient method of enabling the operation of the service application, but such automated initialization also properly provides all necessary aspects of the database, i.e., data field types, lengths, etcetera, are all derived from the creation of the service application and are therefore accurate.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
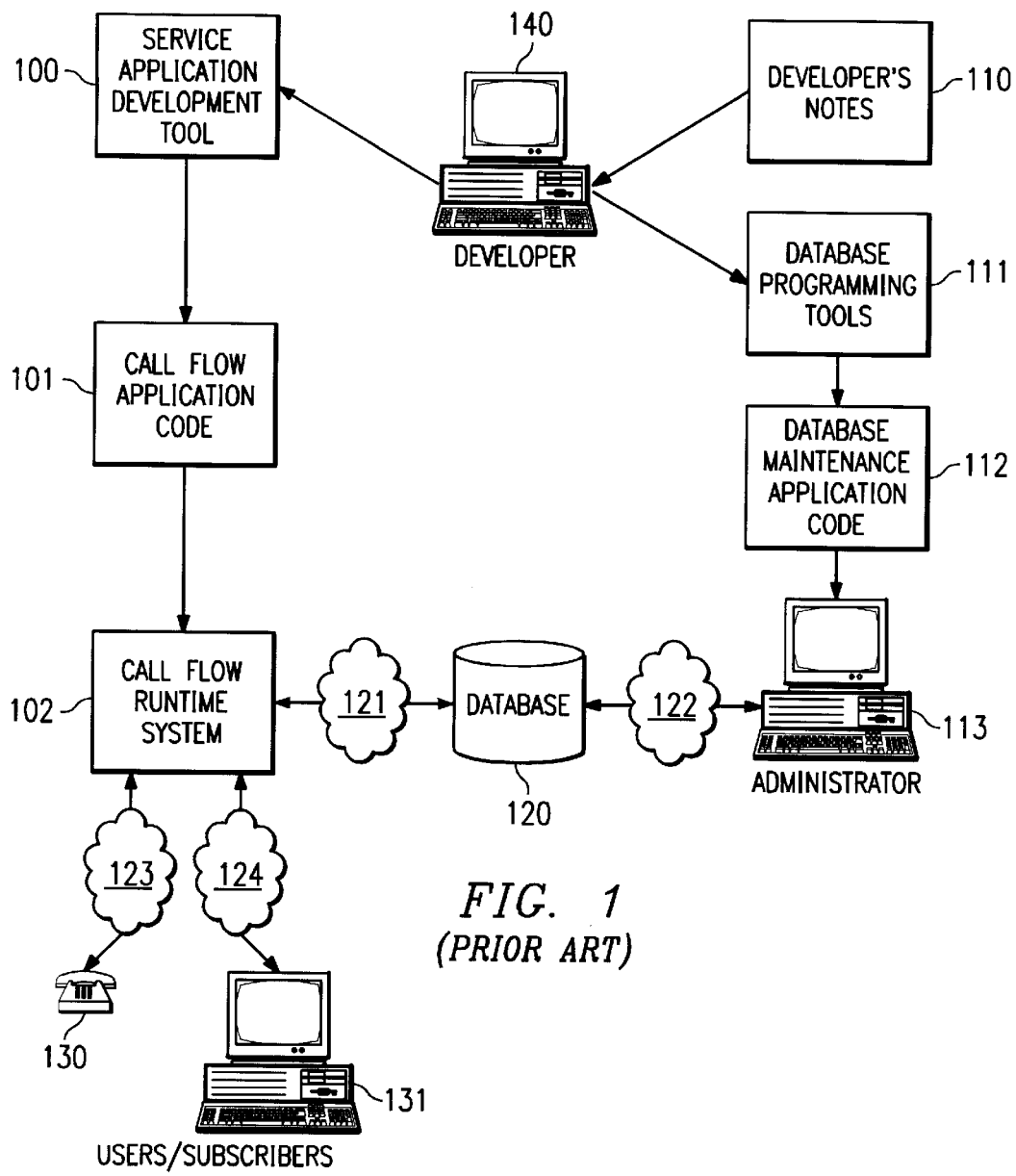
FIG. 1 illustrates a typical prior art system for deploying a VRU service application.

In order to better understand the features and advantages of the present invention, reference is made to typical prior art development and implementation of a VRU application as shown in FIG. 1. Box 100 is a service application creation tool which interacts with the application developer through an interface such as processor-based system (PC) 140. The developer uses the service application development tool to describe the desired application in some sort of high level structured vernacular. This development tool may be a development language, such as the C programming language, or it may be a scripting tool designed specifically for development of the particular type of service application.

Such service application development tools are typically used in the context of generating call flows for VRUs, call automation applications, or voice activated applications. However, it shall be appreciated that the present invention is not limited to development of such applications and is useful in development of a variety of applications utilizing data elements.

Through the developer's interaction with application development tool 100, code for enabling a system to operate as the developer has indicated is produced as call flow application code (box 101). This code may be in any number of forms, such as a particular object code, generated by the service creation tool. The application defined by this application code will typically describe the call flow dialogue, providing for caller interaction with any user interfaces of a service system such as a database or a host interface.

The call flow run time system (box 102) consists of a processor based system suitable for executing the call flow application code, and typically includes telephony and data interfaces. The telephony interfaces, can be utilized for receiving calls, placing calls, playing voice information, recording voice, etcetera. For example, telephone 130 is interfaced to call flow runtime system 102 through telephone network 123. Telephone network 123 may be any number of communications networks, such as a public switched telephone network (PSTN) or a private branch exchange (PBX).

Data interfaces can be utilized to access databases and remote hosts and/or might provide interfacing for users or administrators utilizing information systems not coupled via telephony interfaces. For example, processor-based system (PC) 131 is interfaced to call flow runtime system 102 through data network 124. Likewise, data network 121 is providing information communication between call flow runtime system 102 and database 120.

Call flow application 101 as executed by run time system 102 requires certain data elements to be accessed either at application initialization or during execution. For instance, upon application initialization, configuration information may be retrieved from database 120. Similarly, during utilization by a particular user, subscriber preferences regarding application or feature preferences of the user may be retrieved from database 120. This may typically be accomplished through SQL queries, or other more proprietary access methods, to an open database.

However, in this prior art system, the application data elements must be initialized, described, and maintained through a separate set of tools. For example, while developing the call flow application in the service application development tool, the developer may keep notes (box 110), or other records, describing the various data elements created and/or used by the application.

Presently, there is typically a step, contemporaneous with the development of the application using service application creation tool 100, that, as the data elements are defined within the application environment, notes are made about these data elements. These may be computer generated notes or, in less sophisticated systems, the developer may have to make handwritten notes on a piece of paper describing the data elements. Regardless of their source, however, the notes typically include the data elements and information regarding their data structure.

When any high level programming language or service creation environment is used, one of the goals is to reuse code, or portions of code, to take advantage of predefined modules or functions. However, each of these predefined functions may be describing data elements or data required at the module level that the parent application must inherit in order to take advantage of the function.

Unfortunately, there is not much discipline in how the name space is defined, how the data is inherited by the parent application, or how the data is managed by the parent application. For example, the parent application may not even be aware of certain data elements that are used within a function, or subroutine module. However, from a database maintenance perspective, the developer needs to be aware of all the data elements utilized within the application. Therefore, as the developer is generating the application using, for example, a C function library or some other prior art tool she/he would need to discover and note all of the data elements that are used in order to later be able to build a database accordingly.

Thereafter, through a very manual process, the developer must generate the necessary data structure as well as utilities useful in maintaining the data structure. For example, data element information provided in developer's notes 110 may be input in database programming tools 111 by a developer using PC 140. Database programming tools 111 could be anything from the C programming language, to more high level constructs, such as visual basic with database extensions, PARADOX or any number of database query tools that exist today.

The developer typically writes a set of user interfaces, in the form of database application code 112, to perform functions, like initializing the database, reading back the data, and writing and/or modifying certain data elements. This database maintenance application typically runs on a processor-based system, such as PC 113, having access to the database such as through network 122. This network could be a local area network, for example, or the database itself could be co-resident with the database maintenance application code.

The developer not only defines the user interface of the database maintenance application to accept/manipulate data elements in the form they are expected, but this person must also describe the graphical layout of user interface screens with these tools. The proper layout of the interface screens presents more than just a visually pleasing user interface by organizing related data elements in order to present them in a readily understandable fashion. This requires additional developer consideration, and when additional data elements are added, each require substantial developer time to properly organize.

From the above discussion of the prior art, it can be seen that two separate development routes are necessary in order to develop a single service application; one development route to generate the application code and another development route to generate a maintenance application in order to define, initialize, and maintain necessary data structures.

The present invention defines a system and method which, as part of the application generation process, automatically provides definitions of data elements or data objects supplied within an application creation tool. Directing attention to FIG. 2, development of a service application according to the present invention is illustrated.

Figure 2:
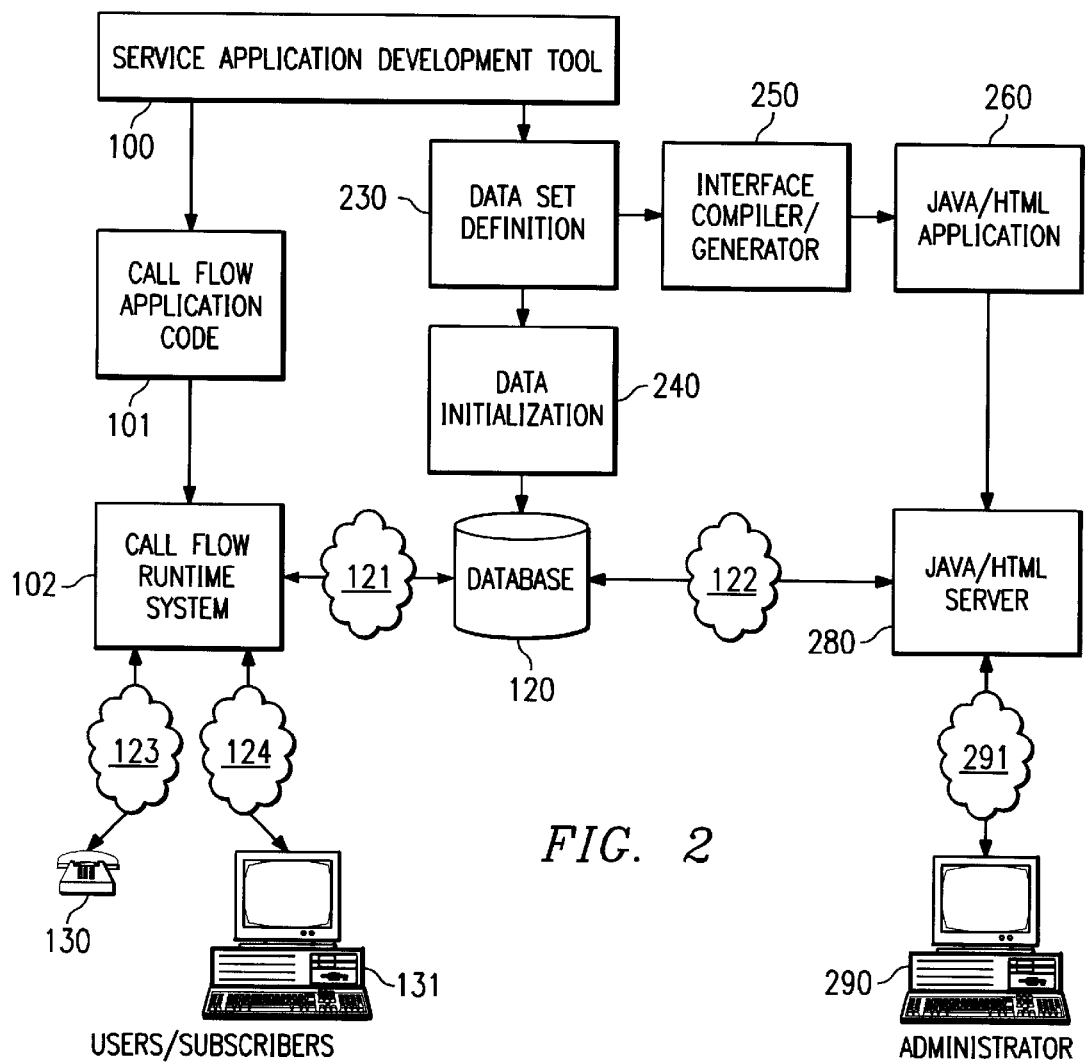
FIG. 2 illustrates deployment of a VRU service application according to the present invention.

As in the prior art of FIG. 1, service application development tool 100 of FIG. 2 is the developer interface used, or the environment that programmers use, to develop, in this case, a call processing application. Development tool 100 is used by the developer to generate call flow application code 101 that is a description of the dialogue with the caller, interaction with data elements, and so on, that are executed by run time system 102. The run time system will have telephony interfaces, and various data interfaces, such as are coupled to data network 121 providing information communication to database 120.

However, according to the present invention, data set definition 230 is gleaned from information available within service application development tool 100. As previously discussed, the service development tool includes within it information regarding data elements utilized therein, whether native to the generated application or inherited from functions or subroutine modules. Therefore, the present invention includes adaptation of service application development tool 100 in order to automatically keep track of these predefined data elements as data set definition 230. A development tool such as may be used with or adapted to include the present invention, is disclosed in the above referenced copending, commonly assigned, patent application entitled "Enhanced Graphical Development Environment for Controlling Program Flow", incorporated herein by reference.

In order to automatically generate data set definition information according to the present invention, development tool 100 may had programming modifications made thereto to detect the inclusion of data elements within any generated application code. For example, development tool 100 may include algorithms to detect data elements in functions or subroutines integrated within the application being developed. Thereafter, the data element information, including any parameters as described below, may be stored within data set definition 230.

Similarly, upon new variables and other data elements being defined by the developer, the development tool may instigate algorithms to manage a data set definition function to provide the data element information to be stored within data set definition 230. The algorithm may, for example, query the developer upon definition of the data element for various aspects of the information needed for data set definition 230.

Rather than altering the code of a service application development tool, the features of the present invention may be realized in an embodiment using algorithms operating concurrently with the development tool. For example, a memory resident, or terminate and stay resident (TSR), program may be executed concurrently with development tool 100 to filter information with respect to data elements to data set definition 230. Where needed, the TSR might suspend operation of the development tool in order to query the developer for any information needed for data set definition 230. It shall be appreciated that an advantage of this embodiment is that it may be utilized as an "add on" application with any number of existing development tools already in existence, without the need to significantly alter the development tool.

Alternatively, a discrete application could be utilized which, when executed, would filter the results of the development tool in order to generate data set definition 230. For example, an application could be used which, after a the development tool is used to generate application code, reads the application code to filter information regarding the data sets utilized therein. This information could then be used to create data set definition 230. It shall be appreciated, however, that such a discrete application requires developer intervention, i.e., an additional development step, in order to produce the data set definition.

Figure 3:
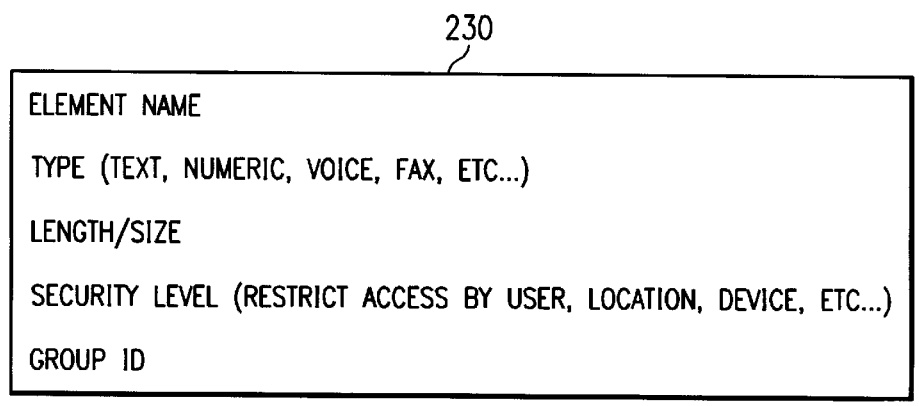
FIG. 3 illustrates information regarding various data elements comprising the data set definition of a preferred embodiment of the present invention.

Regardless of the embodiment used to generate data set definition 230, substantially at the time the developed application is ready to go from the programming environment to a run time environment, the call flow data set definition is generated to include information with respect to the data elements. Referring to FIG. 3, some aspects typically important with respect to the initialization of a database and/or with respect to generation of a data maintenance interface are shown as information fields within data set definition 230. In this preferred embodiment, data set definition 230 includes the name of the data element, a data type, such as text, numeric, voice, fax or the like, the length or size of the data element, a security level, such as to restrict access by user, location, device type or the like, and a group ID, used for presentation in a user interface such as for screen formatting.

It shall be appreciated that a substantial portion of these data element aspects may be ascertained solely from reference to the definition of the data element within the development tool. However, some of the data element aspects require information beyond the scope of a definition of the data element itself. For example, security level and group ID information will typically depend in large part on how a developer wishes the application to behave. Therefore, in a preferred embodiment, these data element aspects are queried from the developer during service application development.

Of course, default values for these aspects may be provided by the present invention where developer queries are not desired. For example, a global default security level providing for the modification of data elements only by a system administrator from a system administrator input device may be initially indicated. Thereafter, the system administrator may modify this default value through database maintenance. Of course, different default security levels may be set for different types, categories, or classes of data elements, rather than a global default, if desired. For example, default values may be selected by a context in which the data element is used.

Similarly, default values for the group ID aspect of the data elements may be assigned, rather than querying the developer. For example, a default value for group ID may be assigned based upon the function, subroutine, or portion of the application in which the data element is utilized. Of course, any assignment of a default value could be overridden by the developer, if desired.

The data set definition is utilized in a number of ways by the present invention; data initialization 240 utilizes data set definition 230 to initially create the data structure and fill data on database 120, and interface compiler/generator 250 utilizes data set definition 230 to produce a user/maintenance interface application such as Java/HTML application 260.

Whenever a new application is loaded onto the run time system, the corresponding database has to be created or initialized. Therefore, in a preferred embodiment, data initialization 240 initializes a database utilizing data set definition 230, setting some initial state to the defined data elements. For example, data initialization 240 physically creates the database structure, including data fields, creating the table definitions if it is an SQL database, the specific column names, and actually filling the database with some initial information. Such initialization of the database may be accomplished by a database maintenance algorithm referencing data set definition 230. Therefore, it shall be appreciated that data initialization 240 may comprise a database maintenance algorithm adapted to interface with data set definition 230 and database 120. Of course, this algorithm may be operable upon a processor-based system (not shown) in data communication with database 120 or may co-reside with database 120.

Once the database structure is created, the run time system could execute the application. However, upon initialization of the database by data initialization 240, there may be no subscriber specific or application configuration data in place, such as where default information with respect to the subscriber and/or application configuration is used.

There are a number of ways that subscriber specific and/or application configuration data may be input into the present invention. The run time system itself, executing the call flow application, may allow subscribers to initialize their databases. For example users, via DTMF telephone coupled to telephone network 123 may modify, add, or select system options by manipulating various data elements. Specifically, using run time system 120, callers, through telephone network 121 and telephone 122, call into the run time system and interact with the database under control of the call flow application to control and initialize data elements.

Alternatively, initialization and modification of these data elements, or a portion thereof, may be under the control of a trusted user such as a system administrator. This method is preferred where there is a set of data that, for purposes of system security or fault tolerance, is not modifiable by all users. Therefore, the present invention also utilizes data set definition 230 to produce user/maintenance interfaces which provide database access separate from the runtime system.

Referring again to FIG. 2, interface compiler/generator 250, utilizes the data set definition, i.e., the information provided out of the service application as generated, including the aspects type, length, size, security level, etc., to generate application code. For example, interface compiler/generator may generate Java or HTML application code suitable for use by an operator in initializing/maintaining the database. Java and HTML application code is preferred as these are languages, dealing with the Internet and Internet applications, commonly used in the industry.

Interface compiler/generator 250 utilizes the information provided in data set definition 230 to generate, for example, screens using Java providing predefined fields in which an operator may input or modify a data element or an aspect of a data element. For instance, where a data maintenance screen is to be presented on HTML browser 190, screen code would be generated to present data to be manipulated in properly defined fields.

Where, for example, a text field is defined for data element input, only text would be accepted in the field. If an attempt to input a numeric, or other unacceptable data type, it would not be allowed. Likewise, where a field is defined as numeric, only numeric values may be input. Furthermore, these fields may be limited to a certain length, a certain range of values, or the like. As such, whatever editing characteristics are required for a given data element are implemented within application 260.

From information available within data set definition 230, interface compiler/generator 250 also describes the relationship of the data elements within the user interface, such as graphically within the maintenance screen. This information is derived by the compiler from the group ID aspect of the data set definition.

Grouping of data elements for presentation within the user interface is advantageous in allowing a user or system administrator to view related data elements simultaneously in order to more easily determine proper modification of a particular data element. For example, within a voice mail application where data elements describe for each user the number of mail boxes, the length of the mail boxes, and how long they may maintain a message on the system, these elements are all related. To aid a user or system administrator in initializing or modifying a particular one of these data elements, presentation of all of the elements may be desired.

Therefore, according to the present invention, the application developer could indicate that these elements should be grouped by properly selecting a group ID. By referencing the group ID aspect for the various data elements, interface compiler/generator 250 will generate a screen of related data elements.

As a particular data element may be related to a variety of groups of data elements, the group ID aspect may indicate affiliation with more than a single group. When properly indicated in the group ID, a data element will appear in different screens. Moreover, a particular group affiliation may be simply for reference rather than manipulation. Therefore, it may be indicated within the group ID that the data element is to be presented with other data elements of a particular group without the ability for the user or system administrator to alter this element when presented in this interface.

Interface compiler/generator 250 preferably comprises an algorithm in conjunction with a knowledge-based system which, through reference to the information of data set definition 240, is able to produce interface application code. Therefore, it shall be appreciated that interface compiler/generator 250 may comprise an algorithm adapted to interface with data set definition 230 which is operable on any number of processor based systems, such as server 280 or PC 290.

Once application 260 is generated by interface compiler/generator 250, it may be executed on a processor-based system, such as Java/HTML server 280, in information communication with database 120. Here a user or system administrator could utilize a processor-based system, such as PC 290, equipped with an HTML browser in order to initialize/maintain the database associated with the service application operating on runtime system 102.

Server 280 and PC 290 are illustrated as interfaced through networks 122 and 291 respectively, which could be local networks, wide area networks, the Internet, or the like. Of course, the server and/or user system may be co-resident with one another, as well as the database and/or runtime system, if desired An advantage of this system is that discrete steps that were very cumbersome in the prior art, i.e., generating an application, creating a user administrative interface to the database, and initializing the database, are automated. Moreover, as the data set definition, and thus the user interface code and database initialization, is generated from the developer's creation of the service application within the development tool, modification of the service application within the development tool will automatically update or synchronize these applications.

Figure 4:
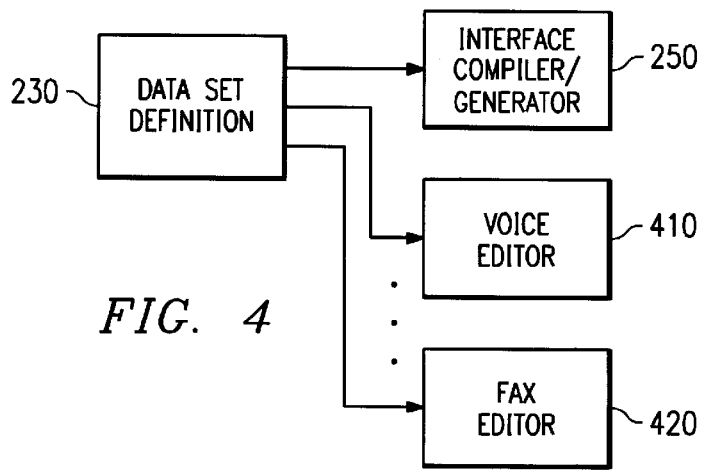
FIG. 4 illustrates multiple uses of the data set definition of the present invention.

Although the present invention has been discussed primarily with respect to the generation of a user interface from the data set definition, it shall be appreciated that this inventive data set definition may be further utilized according to the present invention. Directing attention to FIG. 4, various applications which may utilize the data set definitions are illustrated. For example, where the service application is a VRU application, data element information regarding voice messages may be provided to voice editor 410 to at least partially automate the generation of suitable voice messages. Likewise, data element information regarding VRU fax responses or the like may be provided to fax editor 420 to automate the generation of a suitable fax database. Moreover, relevant information contained within the data set definition of the present invention may also be provided for use in configuring hardware components. For example, information regarding data elements may be provided by data set definition 230 to call flow routine system 102 in order to properly configure the hardware to operate with the service application.

As described above, the present invention may be utilized to provide information regarding data elements used in a service application to all layers of the deployment. Data element information within a development tool is not limited to use in the application layer, as is the case in the prior art, but may be utilized in the user layer, in providing user interfaces, as well as the hardware layer, in providing hardware configuration.

Although the present invention and its advantages have been described in detail, it should be understood that various changes, substitutions and alterations can be made herein without departing from the spirit and scope of the invention as defined by the appended claims.

What is claimed is:

1. A system for substantially automatically providing a database utility for data elements utilized by a service application, said service application being developed by a user:

means for generating an information set including information with respect to each data element of said plurality of data elements, said generating means operable substantially contemporaneously with development of said service application; and means operable at least in part through reference to said information set for creating a data element interface empowering a user to manipulate select ones of said plurality of data elements.

2. The system of claim 1, wherein said creating means is operable substantially contemporaneously with development of said service application within said development tool.

3. The system of claim 1, wherein said generating means is operable substantially automatically upon completion of development of said service application in said development tool.

4. The system of claim 1, wherein said generating means is operable upon modification of said service application in said development tool.

5. The system of claim 1, wherein said generating means is operable to generate said information set at least in part from information available within said application development tool.

6. The system of claim 1, wherein said interface comprises an application program defining data element maintenance screens.

7. The system of claim 6, wherein said reference to said information set determines an attribute of a data entry field of said maintenance screens with respect to ones of said data elements.

8. The system of claim 6, wherein inclusion of select ones of said data elements within a particular one of said data element maintenance screens is determined at least in part through reference to said information set.

9. The system of claim 6, wherein said application program is adapted to provide input/output in a standardized format.

10. The system of claim 9, wherein said standardized format is compatible with a network protocol.

11. The system of claim 9, wherein said standardized format is selected from the group consisting of HTML and Java.

12. The system of claim 1, further comprising:

means for initializing a database to include data structure suitable for use by said service application, said initializing means utilizing information provided by said information set to determine said data structure.

13. The system of claim 12, wherein said initializing means comprises:
   means for automatically inputting initial fill data within said initialized database.

14. The system of claim 13, wherein the content of a portion of said fill data is determined through reference to said information set.

15. The system of claim 13, wherein the content of a portion of said fill data is provided by said filling means as a default value based at least in part on information in said information set with respect to a particular data element.

16. The system of claim 1, wherein said generated information set includes information with respect to each said data element selected from the group consisting of:
   a data element name;
   a data element type;
   a data element size;
   a security restriction; and
   a group affiliation.

17. The system of claim 1, wherein said service application is a voice response unit application operable on a processor-based system providing call handling functionality.

18. The system of claim 17, wherein said interface is a database maintenance application operable on a processor-based system discrete from said call handling processor-based system.

19. A method for providing database initialization of a data set utilized by a service application, said method comprising the steps of:
   developing said service application including defining data elements to be utilized by said service application;
   generating a data set definition including information with respect to said data elements, said generating step being performed automatically and substantially contemporaneously with said developing step; and
   initializing a database to include data structure suitable for use by said service application, said initializing step utilizing information provided by said data set to determine said data structure.

20. The method of claim 19, wherein said developing step comprises the use of an application development tool.

21. The method of claim 20, wherein said generating step is an integrated portion of said application development tool.

22. The method of claim 20, wherein said generating step is discrete from said application development tool.

23. The method of claim 19, wherein said generated data set includes information with respect to each said data element selected from the group of data element information consisting of:
   a data element name;
   a data element type;
   a data element size;
   a security restriction; and
   a group affiliation.

24. The method of claim 19, wherein said initializing step further comprises the step of:
   filling data within said initialized database.

25. The method of claim 24, wherein the content of a portion of said fill data is determined through reference to said data set definition.

26. The method of claim 24, wherein the content of a portion of said fill data is provided by said filling step as a default value based at least in part on information in said data set definition with respect to a particular data element.

27. The method of claim 19, further comprising the step of:
   creating at least in part through reference to said data set definition a data element user interface empowering a user to manipulate ones of said data elements, said creating step being performed automatically.

28. The method of claim 27, wherein said creating step is performed substantially contemporaneously with said generating step.

29. The method of claim 27, wherein said user interface comprises an application program defining data element input screens.

30. The method of claim 29, wherein said reference to said data set definition determines an attribute of a data entry field of said input screens.

31. The method of claim 29, wherein said application program is adapted to provide input/output in a standardized format for use with a compatible browser.

32. The method of claim 31, wherein said standardized format is compatible with HTML.

33. The method of claim 19, wherein said service application is a telephone application operable on a processor-based system having telephone interfaces.

34. A system for providing database management for a data set utilized by an application program having a plurality of data elements defined therein, said application program being developed within an application development tool, said system comprising:
   means for generating a data set definition including information with respect to each data element of said plurality of data elements, said generating means operable substantially contemporaneous with development of said application program within said development tool;
   means for initializing a database to include data structure suitable for use by said application program, said initializing means utilizing information provided by said data set definition to determine said data structure; and
   means operable at least in part through reference to said data set definition for developing a data element user interface enabling a user to manipulate select ones of said plurality of data elements, said developing means being operable substantially contemporaneous with development of said application program within said development tool.

35. The system of claim 34, wherein said generating means is operable substantially automatically.

36. The system of claim 34, wherein said initializing means is operable substantially automatically.

37. The system of claim 34, wherein said developing means is operable substantially automatically.

38. The system of claim 34, wherein said generated data set definition includes information selected from the group consisting of:
   data identification;
   data type;
   data size;
   access restriction; and
   group identification.

39. The system of claim 38, wherein said generating means is operable to determine at least a portion of said information from information available within said application development tool.

40. The system of claim 39, wherein said generating means also queries an operator with respect to information utilized to generate said data set definition.

41. The system of claim 40, wherein said queried information is selected from the group consisting of:

said access restriction; and said group identification.

42. The system of claim 34, wherein said user interface comprises an interface application providing structured input/output.

43. The system of claim 42, wherein said interface application is discrete from said application program.

44. The system of claim 42, wherein said reference to said data set definition determines an attribute of said structured input/output with respect to ones of said data elements.

45. The system of claim 42, wherein associated input/output of particular ones of said data elements according to said structured input/output is determined at least in part through reference to said data set definition.

46. The system of claim 42, wherein said structured input/output is provided in a standardized format for use with a predefined instruction set.

47. The system of claim 46, wherein said predefined instruction set is selected from the group consisting of HTML and Java.

48. The system of claim 34, wherein said initializing means comprises:

means for filling data within said data structure to create an initial database suitable for operation of said application program.

49. The system of claim 48, wherein the content of a portion of said fill data is determined through reference to said data set definition.

50. The system of claim 48, wherein the content of a portion of said fill data is provided by said filling means as a default value based at least in part on information in said data set definition with respect to a particular data element.

51. The system of claim 34, wherein said application program is operable on a telephone system.

52. The system of claim 51, wherein said interface is a database maintenance application operable on a processor-based system discrete from said telephone system.

53. A system for providing management of a plurality of data components utilized by a voice response application, said application being developed within a graphical application development tool, said system comprising:

means for generating a data set including information with respect to data components of said plurality of data components, said generating means operable substantially contemporaneous with development of said application within said development tool;

means for initializing a database to include data structure suitable for use by said application, said initializing means utilizing information included within said data set;

means for filling data within said database suitable for operation of said application program; and means operable at least in part through reference to said data set for developing an interface enabling a user to manipulate select ones of said plurality of data components, said developing means being operable substantially contemporaneous with development of said application within said development tool.

54. The system of claim 53, wherein said generating means includes program algorithms operable with said graphical development tool to determine information with respect to said data components, and wherein said generating means is operable substantially automatically.

55. The system of claim 53, wherein said initializing means includes a program algorithm operable substantially automatically upon completion of development of said application in said graphical development tool.

56. The system of claim 53, wherein said developing means includes a program algorithm operable substantially automatically upon completion of development of said application in said graphical development tool.

57. The system of claim 56, wherein said developing means is further operable upon modification of said application in said graphical development tool.

58. The system of claim 53, wherein said data component information of said data set includes information selected from the group consisting of:

data identification;

data type;

data size;

access restriction; and group identification.

59. The system of claim 58, wherein said data component information is determined at least in part from information available with in said application development tool.

60. The system of claim 59, wherein said generating means also queries an operator with respect to said data component information.

61. The system of claim 60, wherein said queried information is selected from the group consisting of:

said access restriction; and said group identification.

62. The system of claim 53, wherein said interface comprises an application program defining user screens, and wherein attributes of said user screens are determined by reference to said data set and ones of said data components are associated on particular user screens according to information within said data set.

63. The system of claim 62, wherein said user screens utilize HTML.

* * * * *